April 17, 1934.  G. CAREY  1,954,919
ADVERTISING DEVICE
Filed Dec. 7, 1933
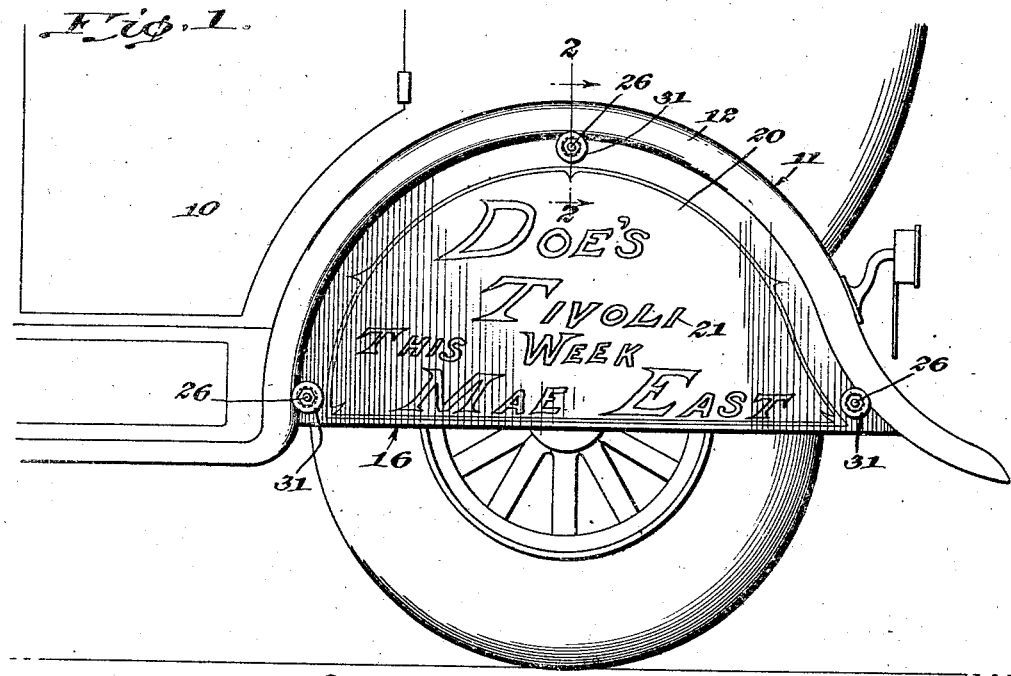
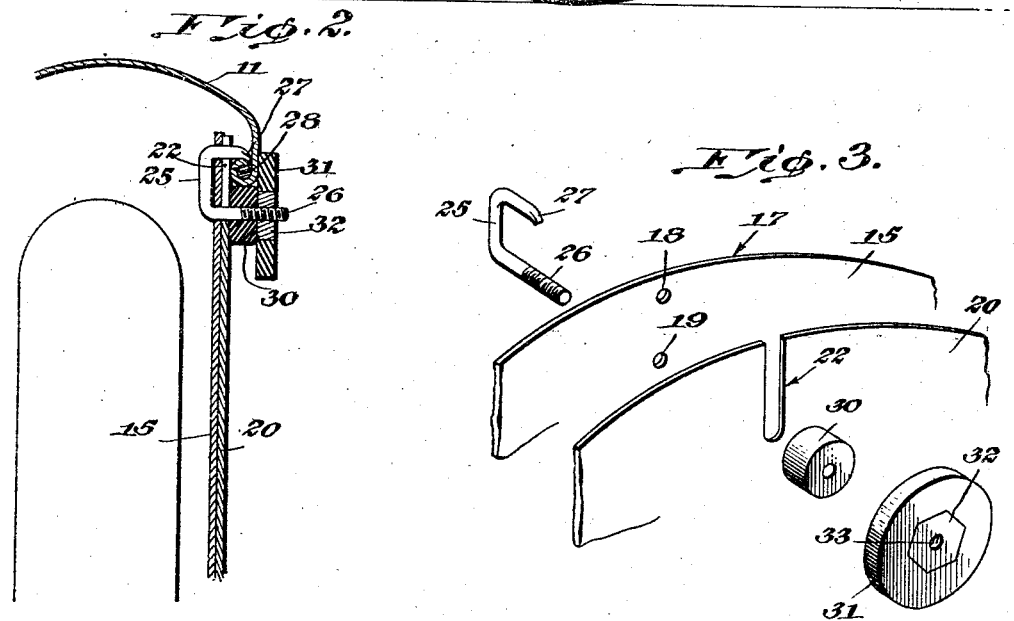
WITNESS
INVENTOR
Gregory Carey,
BY
ATTORNEYS Patented Apr. 17, 1934

1,954,919

UNITED STATES PATENT OFFICE 1,954,919

ADVERTISING DEVICE

Gregory Carey, Paris, Ark.

Application December 7, 1933, Serial No. 701,390

2 Claims. (Cl. 40—129)

This invention relates to advertising devices.

An object of the invention is the provision of an advertising device adapted to be connected to the rear fender of an automobile in such a way that the device may be readily removed or replaced.

A further object of the invention is the provision of an advertising device having a base member upon which is adapted to be applied an advertising card, with hooks and nuts for removably connecting the base to a fender of an automobile whereby it is possible to change the advertising cards at will without the removal of the base member.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a side view in elevation of a portion of an automobile showing my advertising card applied to the fender of the automobile, Figure 2 is a vertical section taken along the line 2—2 of Figure 1, and Figure 3 is a view in perspective of the securing means for the card and base member about to be assembled.

Referring more particularly to the drawing, 10 designates an automobile having a rear fender 11 provided with a downturned flange 12 at the outer periphery thereof.

A base plate 15 formed of some rigid material which may be metal or a composition has a lower straight edge 16 and a curved upper edge 17.

The upper central portion of the base is provided with a pair of passages 18 and 19. The lower opposite corners each are also provided with a similar pair of perforations. A securing means of identical construction is received by these perforations for securing the base member to the fender 11.

A card 20 having advertising matter 21 printed thereon is applied to the base member and is provided with slots 22 adjacent the securing means so that a card may be slipped in position without necessitating the entire removal of the securing means.

The securing means consists of a U-shaped member or hook 25 which has its longer arm threaded, as shown at 26, while the shorter arm has at its free end an inturned portion 27 adapted to engage over a bead 28 on the outer lower edge of the flange 12 of the fender 11. The arms or legs of the U-shaped members are received by the perforations 18 and 19 and a rubber washer 30 engages the outer face of the card 20 and the inner face of a fiber nut 31. This nut is threaded on the portion 26 of the U-shaped member 25. When the nut is drawn up tight the nut in connection with the U-shaped member will clamp the base member 15 and the card 20 securely upon the fender.

If it be desired to replace a card it is only necessary to loosen the nuts 31 and withdraw the slotted portions 22 of the card 20 from the various U-shaped members 25 and another card of similar construction may be inserted and the nuts are tightened for clamping the base member and the card in position.

If desired, a metal nut 32, which is internally threaded at 33, may be imbedded in the fiber member 31 to receive the threads on a portion 26 of the U-shaped member 25.

I claim:—

1. An advertising device adapted to be connected to a relatively thin supporting member having a beaded edge, comprising a rigid base member provided with pairs of spaced perforations, a card having slots, each slot adapted to be alined with a pair of the perforations, a U-shaped bolt for each pair of perforations having the legs thereof received by the perforations and the respective slot in the card, one leg of each bolt being shorter than the other and having the end thereof in engagement with the bead, the other leg projecting outwardly of the base member and card, a washer received by the projecting end of each bolt and disposed in contact with the card, and a nut threaded on to the projecting end of each bolt and overlying the shorter leg of said bolt for clamping the bolt and likewise the base member and card on to the supporting member.

2. A device of the class described comprising a relatively rigid base member contoured to fit beneath the mud-guard of an automobile and adapted to be removably connected thereto, an advertising card of substantially the same configuration as the base member, the base member having pairs of spaced perforations, the card having slots opening through the periphery of said card and adapted to be alined with respective pairs of perforations in the base member, a U-shaped bolt for each pair of perforations and having the legs thereof received by the pair of perforations and an alined slot, one of the legs of each bolt being shorter than the other leg having the end thereof in engagement with the bead and inner face of the mud-guard, a washer on the longer leg of each bolt and in contact with the card, a nut threaded on the longer leg of each bolt, overlying the shorter leg of the respective bolt and clamping the base member and card on the mud-guard.

GREGORY CAREY.